United States Patent [19]
Taylor et al.

[11] Patent Number: 5,557,406
[45] Date of Patent: Sep. 17, 1996

[54] SIGNAL CONDITIONING UNIT FOR FIBER OPTIC SENSORS

[75] Inventors: Henry F. Taylor, College Station; Roberto Sadkowski, Plano; Chung E. Lee, College Station, all of Tex.

[73] Assignee: The Texas A&M University System, College Station, Tex.

[21] Appl. No.: 395,448

[22] Filed: Feb. 28, 1995

[51] Int. Cl.⁶ .................................................. G01B 9/02
[52] U.S. Cl. .................. 356/345; 356/352; 250/227.27
[58] Field of Search .................................. 356/345, 35.5, 356/352, 349, 350; 250/227.19, 227.27

[56] References Cited

U.S. PATENT DOCUMENTS

| | | | |
|---|---|---|---|
| 4,767,210 | 8/1988 | Kashyap | 356/345 |
| 5,402,230 | 3/1995 | Tian et al. | 356/345 |
| 5,452,086 | 9/1995 | Bunn | 356/345 |
| 5,452,087 | 9/1995 | Taylor et al. | 356/345 |

OTHER PUBLICATIONS

Anthony Dandridge, et al., "Homodyne Demodulation Scheme for Fiber Optic Sensors Using Phase Generated Carrier", *IEEE Journal of Quantum Electronics*, vol. QE-18, No. 10, Oct. 1982, pp. 1647–1653.

D. A. Jackson, et al., "Pseudoheterodyne Detection Scheme for Optical Interferometers", *Electronics Letters*, 9th Dec. 1982, vol. 18, No. 25, pp. 1081–1083.

I. J. Bush, et al., "High Performance Interferometric Demodulation Techniques", SPIE vol. 1795 *Fiber Optic and Laser Sensors* X (1992), pp. 412–420.

Y. Yeh, et al., "In-Line Fabry–Perot Interferometric Temperature Sensor with Digital Signal Processing", SPIE vol. 1584 *Fiber Optic and Laser Sensors* IX (1991), pp. 72–78.

R. A. Atkins, et al., "Fiber-Optic Pressure Sensors for Internal Combustion Engines", *Applied Optics*, vol. 33, No. 7, 1 Mar. 1994, pp. 1315–1320.

*Primary Examiner*—Frank Gonzalez
*Assistant Examiner*—Robert Kim
*Attorney, Agent, or Firm*—Baker & Botts, L.L.P.

[57] ABSTRACT

Apparatus and method (10, 50) for determining the value of a measurand measured by a fiber optic interferometer sensor (24, 72, 110) is provided. The apparatus includes a light source (16, 58, 102) emitting a light having a periodically modulated frequency which is injected into the interferometric sensor. A modulation cycle is initiated by the microcontroller's (12, 56, 116) generation of a trigger signal. A counter (42, 86) begins counting in response to the trigger signal. A first photodetector (20, 66) is coupled to the light source (16, 58, 102) and produces a first electrical signal proportional to the light. A second photodetector (36, 76, 114) is coupled to the fiber optic interferometer sensor (24, 72, 110) and produces a second electrical signal proportional to the light reflected by the sensor or passed through the sensor and affected by the measurand. A comparator (40, 82, 116) compares the second electrical signal with the first electrical signal and detects a crossing of the first and second electrical signals. The counter (42, 86) stops counting in response to a detected signal crossing. The microcontroller (12, 56, 116) then computes a measurand value from the count value for each modulation cycle.

28 Claims, 4 Drawing Sheets

SIGNAL CONDITIONING UNIT FOR FIBER OPTIC SENSORS

TECHNICAL FIELD OF THE INVENTION

This invention relates in general to the field of fiber optics as applied to sensing and measurement. More particularly, the present invention relates to apparatus and method of using optical and electronic components in conjunction with a fiber optic sensor to determine the value of a measurand sensed by the fiber optic sensor.

BACKGROUND OF THE INVENTION

A number of signal processing schemes for interferometric fiber sensors which make use of frequency modulation (FM) of a semiconductor laser light source are known in the art. These approaches are designed to overcome the classical sensitivity null and direction of phase change ambiguity problems in interferometers, at which points the interferometer is not useful for measuring small changes in the relative phase shift $\omega$. In particular, they are applicable to unbalanced Michelson and Mach-Zehnder interferometers and to low-finesse Fabry-Perot interferometers. The commonly used phase generated carrier approach employs a sinusoidal FM modulating waveform at radian frequency $\omega$ with mixing, differentiation, cross-multiplication, subtraction, and integration to recover $\phi$. This approach is described by Dandridge et al. in *IEEE Journal of Quantum Electronics*, vol. QE-18, pages 1647–1653, Oct. 1982. An alternative method uses a sawtooth FM waveform (linear chirp) for the laser output, with a phase detector for demodulation. This method is described by Jackson et al. in *Electronics Letters*, vol. 18, pp. 1081–1083, Dec. 9, 1982.

The FM signal processing schemes described above use analog electronic circuits. As the long-term trend towards less expensive digital signal processing (DSP) integrated circuits continues, their use becomes less cost-effective. In one such case, the phase generated carrier approach was implemented with a combination of a preprocessor providing analog sin $\phi$ and cos $\phi$ inputs to a digital processor which computed $\phi$. This approach is described by Bush and Sherman in *SPIE*, vol. 1795, pp. 412–420, 1992. In another case, a square current pulse produced frequency modulation of a laser, the sensor output was sampled and digitized at two different times during the pulse, and $\phi$ was determined using a look-up table. This is described in by Yeh et al. in *SPIE*, vol. 1584, pp. 72–78, 1991.

Thus, by using a continuous wave, constant frequency light source, it is difficult to measure small phase changes in an interferometer with a high degree of precision. It has become desirable to overcome the problem of sensitivity nulls, ambiguities in direction of phase changes, and non-linear dependence of optical output on phase shift by employing digital processing circuits and methods.

SUMMARY OF THE INVENTION

The present invention makes use of FM modulation of a laser light source in a novel digital signal processing apparatus in which the value of the relative phase shift $\phi$ in an interferometer is determined. The system is particularly applicable for use with interferometric fiber optic sensors. A particular class of interferometric fiber optic sensors uses a fiber Fabry-Perot interferometer (FFPI) to measuring in-cylinder pressure in internal combustion engines.

In accordance with the present invention, a microcontroller-based digital signal processing system is provided for use with interferometric fiber optic sensors. A single laser source provides optical power for one or more such sensors. The laser current is repetitively modulated so the frequency of the emitted light is substantially a linear function of time during part or all of a modulation cycle. The interferometer phase shift is substantially proportional to the elapsed time from the initiation of a modulation cycle until the sensor output signal level crosses a threshold value proportional to the laser output power. This elapsed time, which varies in proportion to the value of a measurand which affects said interferometric fiber optic sensor, is determined using a digital timer or counter. The timer or counter output is multiplied by a predetermined calibration factor to obtain a digital representation of the measurand value.

BRIEF DESCRIPTION OF THE DRAWINGS

For a better understanding of the present invention, reference may be made to the accompanying drawings, in which.

DETAILED DESCRIPTION OF THE INVENTION

Figure 1:
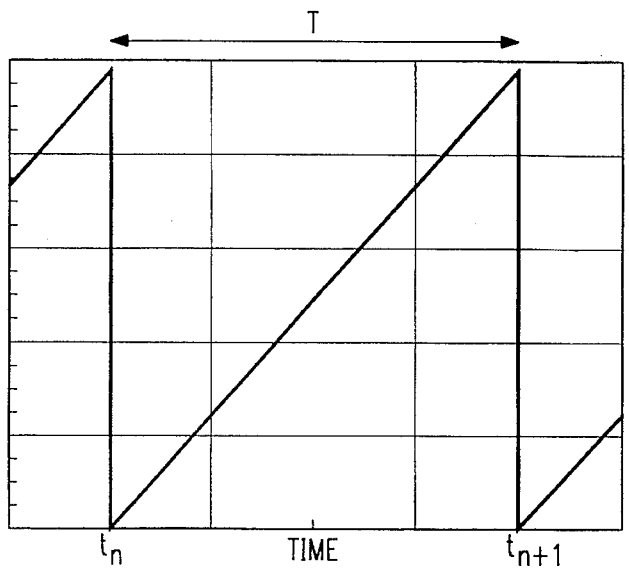
FIG. 1 is a simplified diagram illustrating the frequency vs. time emitted by a modulated semiconductor laser light source in a preferred embodiment of this invention.

The present invention is concerned with the measurement of the relative phase shift $\phi$ in an interferometer. It is assumed that a measurand of interest, such as pressure, strain, or temperature, affects the optical phase shift in said interferometer and the value of said measurand can be related to said phase shift through a calibration factor.

Two of the more common interferometer configurations are the Michelson and the Mach-Zehnder, for which the optical power in an output beam can be written in terms of $\phi$ as $$P_{out} = P_1(1 + k + \cos\phi), \tag{1}$$

where $P_1$ and k are constants characteristic of the optical system and $\phi$. Low-finesse Fabry-Perot interferometers also show a similar response characteristic, with $\phi$ the round-trip optical phase shift. Note that if k=0 the minimum $P_{out}$=0 and the fringe visibility=1. It is convenient to write $\phi$ as $$\phi = \phi_n + \phi_s, \quad (2)$$

where $\phi_n$ is the phase shift in the interferometer due to the measurand of interest and $\phi_s$ is the phase shift which depends on the frequency v of the light source, given by $$\phi_s = 2\pi \Delta L v/c, \quad (3)$$

with $\Delta L$ the optical path length difference in the interferometer and c the free-space speed of light. In equation (2) cross terms between $\phi_n$ and $\phi_s$ have been neglected, which is generally valid if $\phi_n \ll \phi_s$. In general, if v, $\Delta L$, $P_1$ and k are known, it follows from equations (1)-(3) that $\phi_n$ can be determined from the measured output power $P_{out}$ using $$\phi_n = \cos^{-1}[(P_{out} - P_1 - kP_1)/P_1] - \phi_s \quad (4)$$

However, in general $\phi_n$ as described by equation (4) is a highly nonlinear function of $P_{out}$. In particular, the conditions for which $P_{out}$ is a minimum or a maximum represent sensitivity nulls for the interferometer, at which points it is not useful for measuring incremental changes in $\phi_n$.

Thus, it is generally difficult to measure small phase changes in an interferometer with a high degree of precision using a continuous wave, constant frequency light source. However, with semiconductor lasers which can be tuned by changing the bias current or the heat sink temperature, it is often possible to adjust $\phi_s$ to a quadrature condition $$\phi_s = m\pi \pm \pi/2, \text{ with } m=0, \pm1, \pm2, \quad (5)$$

At a quadrature point the sensitivity of $P_{out}$ to changes in $\phi_n$ is a maximum, and to first order $P_{out}$ is a linear function of $\phi_n$.

Operation at quadrature is highly desirable for measurement purposes. However, in cases where optical power for multiple sensors is provided by a single monochromatic laser, simultaneous quadrature operation of all the sensors is not possible. One way to overcome this difficulty is to frequency modulate the laser in periodic fashion with sufficient amplitude that the excursion in $\phi_s$ is at least $\pi$ radians. This ensures that the quadrature condition is satisfied for at least one time during each modulation cycle.

A particularly simple digital approach to signal processing is possible if the laser frequency is modulated periodically in sawtooth fashion such that $$v = v_0 + \alpha(t-t_n), \ t_n \leq t < t_{n+1}, \ n=\text{integer}, \quad (6)$$

where $\alpha$ is a constant which represents the slope of the FM modulation curve. FIG. 1 illustrates this ideal waveform and the relationship between the times $t_n$ and $t_{n+1}$ at which the sawtooth waveforms are initiated and the temporal modulation period $T=t_{n+1}-t_n$. The change in $\phi_s$ during one sawtooth period $\Delta\phi_s$ is determined from equations (3) and (6) to be $$\Delta\phi_s = 2\pi \Delta L \alpha T/c, \quad (7)$$

and $\Delta\phi_s$ must be at least $\pi$ radians so that a quadrature point is crossed during each cycle of duration T.

The signal processor is designed such that value of $\phi_n$ is a linear function of the time from the initiation of the sawtooth waveform until $P_{out}$ given by equation (1) crosses a threshold value $P_{th}$. In the general case (referring to equation 1) that $P_1=P_1(t)$, we can choose $$P_{th} = \beta P_1(t) \quad (8)$$

where $\beta$ is a constant such that $k<\beta<2+k$, and preferably $\beta \approx 1+k$. Then, from equations (1) and (8), the condition that $P_{out}=P_{th}$ can be written $\phi=\phi_c$, with $\phi_c$ a constant given by $$\phi_c = \cos^{-1}(\beta - 1 - k) \quad (9)$$

It then follows from equations (2), (3), and (6) that $$\phi_n = \phi_c - (2\pi\Delta L/c)[v_0 + \alpha(t_{cn}-t_n)], \ t_n \leq t_{cn} < t_{n+1}, \quad (10)$$

where $t_{cn}$ is the time during the nth sawtooth ramp that the threshold crossing occurs.

A portion of the optical power from the laser can be converted to an electrical voltage signal $V_{th}$ by a photodetector and resistive load or amplifier, such that $$V_{th} = C_1 P_{th}, \quad (11)$$

where $C_1$ is a constant. Similarly, a portion of the optical power from the sensor can be converted to an electrical voltage signal $V_{out}$ by a photodetector and resistive load or amplifier, such that $$V_{out} = C_2 P_{out} \quad (12)$$

where $C_2$ is a constant.

Figure 2:
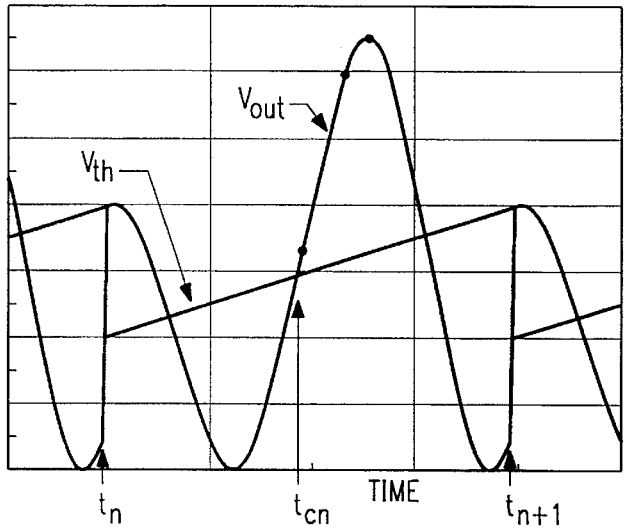
FIG. 2 is an idealized plot of the temporal dependence of the photocurrent from two photodetectors which respectively monitor the light from said modulated light source and the light from an interferometric sensor which receives optical power from said light source.
Figure 3:
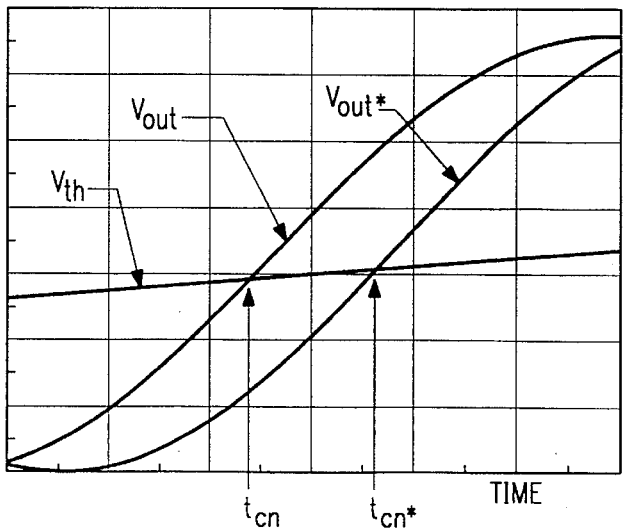
FIG. 3 reproduces the plot of FIG. 2 on an expanded time scale and shows the effect of an optical phase change in an interferometric sensor on the photocurrent signal produced by the light from said sensor.

The variation with time of the two current signals $V_{th}$ and $V_{out}$, proportional respectively to the laser power and the signal from the interferometric sensor, are illustrated in FIG. 2. In FIG. 2, one of the threshold crossings $t_{cn}$ is shown. The information in a portion of FIG. 2 is replotted on an expanded time scale in FIG. 3, which illustrates that a change in the measurand which causes $\phi_n$ to change to a new value $\phi_{n*}$ causes the original voltage waveform $V_{out}(t)$ to shift laterally to a new waveform $V_{out*}(t)$. This causes a shift in the threshold crossing time from $t_{cn}$ to $t_{cn*}$.

To determine the interferometer phase shift, a timed counter or timer is started when the sawtooth is initiated at $t=t_n$, and stopped when a threshold crossing occurs at $t=t_{cn}$. The value of the elapsed time $t_{cn}-t_n$ is then substituted into equation (10) to calculate $\phi_n$. It is assumed that all of the constants in equation (10) have been previously measured or determined by a calibration procedure known to one skilled in the art. Thus, one value for $\phi_n$ is determined for each modulation cycle of duration T. The measurand of interest is generally proportional to $\phi_n$ and can be related to $\phi_n$ by a calibration constant.

Figure 4:
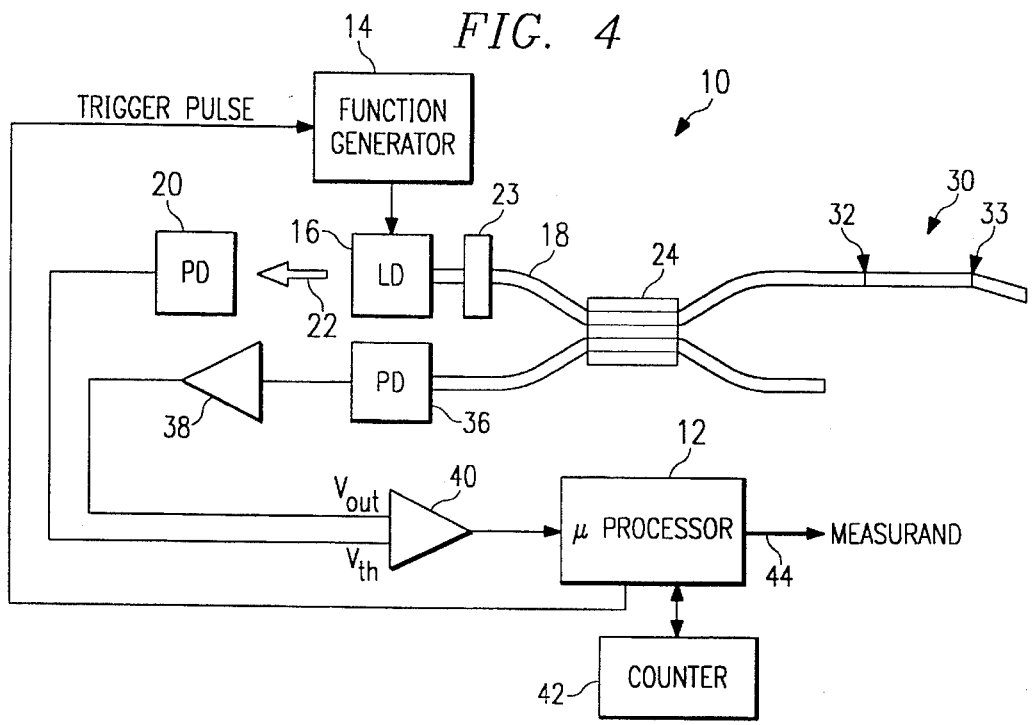
FIG. 4 is a schematic diagram of an embodiment of the microcontroller-based digital signal conditioning system for a single interferometric fiber optic sensor constructed in accordance to the teachings of the present invention.

A system arrangement 10 making use of the FM waveform of equation (6) and FIG. 1 in a signal conditioning unit for use with a fiber interferometer is illustrated in FIG. 4. At the time $t_n$ which begins each modulation cycle, a trigger pulse is sent by a microcontroller or microprocessor 12 to a function generator 14. The microcontroller 12 may be implemented by, for example, Model DS5000T eight-bit microcontroller produced by Dallas Semiconductor. The function generator 14 produces an appropriate current periodic waveform in response to the trigger pulse for modulating the light output from a semiconductor laser diode 16. For example, a sawtooth waveform may be used for this purpose. A portion of the light output from the laser diode 16 is coupled into a single mode optical fiber 18. The semiconductor laser diode 16 may be implemented with, for example, Model NDL5604P produced by Nippon Electric Corporation, which is a distributed feedback laser emitting at a wavelength of approximately 1310 ηm. A first photodetector 20 receives a portion of the laser output power 22 from the laser diode 16 and generates an electrical signal $V_{th}$ proportional to the optical power received by the photodetector 20. An optical isolator 23 may optionally be provided either in the laser package or separately to prevent reflected light from destabilizing the laser output. The light propagating in the optical fiber 18 is then split by a fiber coupler 24 to provide optical power to a fiber optic interferometer sensor such as a Fabry-Perot interferometer sensor 30. Other applicable interferometric sensors include the Mach-Zehnder and the Michelson interferometer sensors. The fiber Fabry-Perot interferometer cavity is bounded by internal dielectric mirrors 32 and 33. A portion of the reflected light from the interferometric sensor 30 is routed through the fiber coupler 24 to a second photodetector 36, which converts the raw optical signal into an electrical signal proportional to the optical power reflected from the sensor 30. The first and second photodetectors 20 and 36 may be implemented by, for example, Model NDL5405 InGaAs PIN Photodiodes produced by Nippon Electric Corporation.

The electrical signal from the second photodetector 36 serves as the input to an operational amplifier 38 which has one or more gain stages. The overall gain of the amplifier 38 is in general designed to be adjustable. The output signal $V_{out}$ from the amplifier 38 is provided as an input to a comparator 40. The signal $V_{th}$ from the first photodetector 20 serves as the other input to the comparator 40. The gain of the amplifier 38 is adjusted so that the two comparator input signals $V_{out}$ and $V_{th}$ cross one or more times during a modulation cycle, as shown in FIG. 2, so that each time a crossing occurs, the comparator output changes from "low" to "high" or vice versa. At the time $t_n$ which begins each modulation cycle, a first control signal is sent by the microcontroller 12 to a counter 42 to initiate the counting of clock pulses generated internally or by a system clock generator. Starting at some preprogrammed time after $t_n$, microcontroller 12 monitors the output signal from the comparator 40 to determine when a selected transition, i.e. from "high" to "low" or vice versa, occurs in the output signal of the comparator 40. When such a change is identified, the microcontroller 12 sends a second control signal to the counter 42 to stop counting. The accumulated count during the time $t_{cn}-t_n$ is then provided to the microcontroller 12, where it is further processed. The microcontroller 12 may process the accumulated count by baseline subtraction to remove common or dc components and then multiplication by a calibration factor to produce a digital output 44 whose value equals that of the parameter of interest or the "measurand". It may be seen that the digital circuitry employed in the system, including the microcontroller 12 and the counter 42 may be implemented in a single semiconductor circuit and residing on the same semiconductor substrate.

FIG. 4 shows one laser 16 providing optical power to a single fiber Fabry-Perot interferometer sensor 30 monitored in reflection. However, the described signal processing scheme also may be applied to other interferometric sensors, such as Michelson interferometer sensors and Mach-Zehnder interferometer sensors, and can be applied to sensors monitored in transmission as well as in reflection as known in the art.

Figure 5:
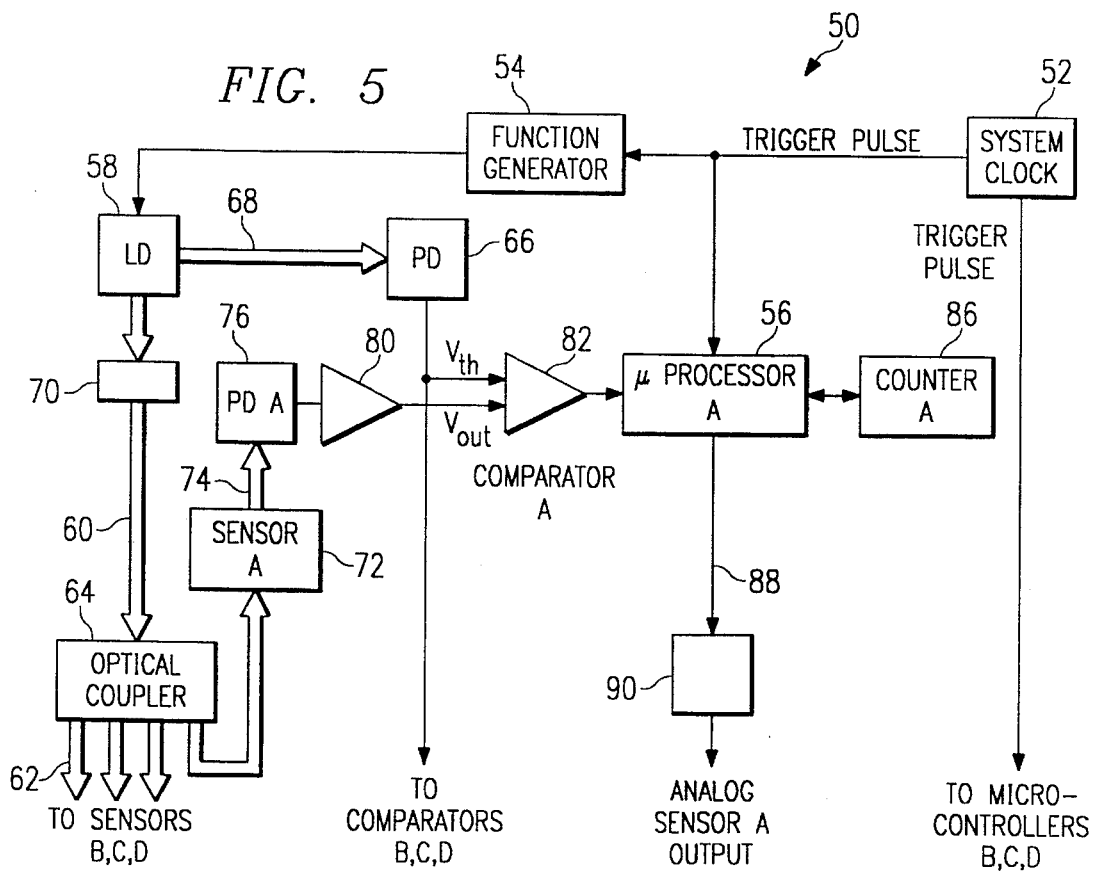
FIG. 5 is a schematic diagram of a microcontroller-based digital signal conditioning system for a multiplicity of interferometric fiber optic sensors constructed in accordance to the teachings of the present invention.

FIG. 5 shows a system arrangement 50 making use of the FM waveform of equation (6) and FIG. 1 for operation of a plurality of interferometric fiber optic sensors. For the purpose of illustration, a four fiber optic sensor system 50 is shown, but which may be expanded according to applications. A system clock 52 generates and sends a trigger pulse at the time $t_n$ to a function generator 54 and four microcontrollers A (reference numeral 56), B, C, and D. The function generator 54 produces an appropriate current waveform for modulating a semiconductor laser diode 58, the light from which is injected into a single mode optical fiber 60 and split into four fiber paths 62 by a optical coupler 64 and delivered to four fiber optic sensors A-D. The optical coupler 64 is also known as a star coupler. A first photodetector 66 receives a portion of the laser output power 68 and produces an electrical signal proportional to the optical power emitted by the laser 58. An optical isolator 70 may optionally be provided either in the laser package or separately to prevent reflected light from destabilizing the laser output.

The light propagating in each of the multiplicity of optical fiber paths 62 is reflected by or transmitted through an interferometric fiber optic sensor A-D in substantially the same manner as illustrated in FIG. 4. Focusing on sensor A 72 for the purpose of illustration, a portion of the reflected or transmitted light from sensor A 72 is routed by an optical fiber 74 to a photodetector A 76, which converts the raw optical signal into an electrical voltage signal proportional to the optical power reflected from or transmitted by sensor A 72.

The electrical signal from the photodetector A 76 serves as the input to an operational amplifier A 80 which has one or more gain stages. The overall gain of the amplifier A 80 is adjustable. The voltage signal from the amplifier A 80 serves as one input to a comparator A 82. The signal from first photodetector 66 serves as the other input to comparator A 82, as well as an input to comparators B-D (not shown) for respective interferometric sensors B-D. It may be appreciated that each sensor B-D are also equipped with respective photodetectors, comparators, microcontrollers and counters for performing similar functions as described in conjunction with sensor A.

As discussed above, the gain of amplifier A 80 is adjusted so that the two input signals $V_{out}$ and $V_{th}$ to comparator A 82 cross one or more times during a modulation cycle, as shown in FIG. 2. Each time a crossing occurs, the comparator output changes from "low" to "high" or vice-versa. At the time $t_n$ which begins each modulation cycle, a first control signal is sent by the system clock 52 to microcontroller A 56, which immediately initiates the counting of clock pulses by a counter A 86. Starting at some predetermined time after $t_n$, microcontroller A 56 monitors the output signal from comparator A 82 to determine when a preprogrammed change (transition from "high" to "low" or vice versa) occurs in the output signal from the comparator 82. When such a change is identified, microcontroller A 56 generates and sends a second control signal to counter A 32 to end the counting procedure. The accumulated count during the period $t_{cn}-t_n$ is then transmitted from counter A 86 to microcontroller A 56, where it is further processed. Further processing includes baseline subtraction to remove common or dc components and multiplication by a calibration factor to produce a digital output 88. whose value represents the measured value of the parameter of interest or "measurand." The digital output 88 may optionally be further processed by a digital-to-analog converter 90 to produce an analog representation of the measurand as a function of time.

The illustration of FIG. 5 shows four sensors A-D being operated from a single laser 58, but it is evident that the concept is equally valid for operation of a lesser or greater number of sensors with light from a single modulated laser. It may be appreciated by one skilled in the art that the circuits used in the instant system be integrated on a single semiconductor substrate, including all the microcontrollers and the counters.

Figure 6:
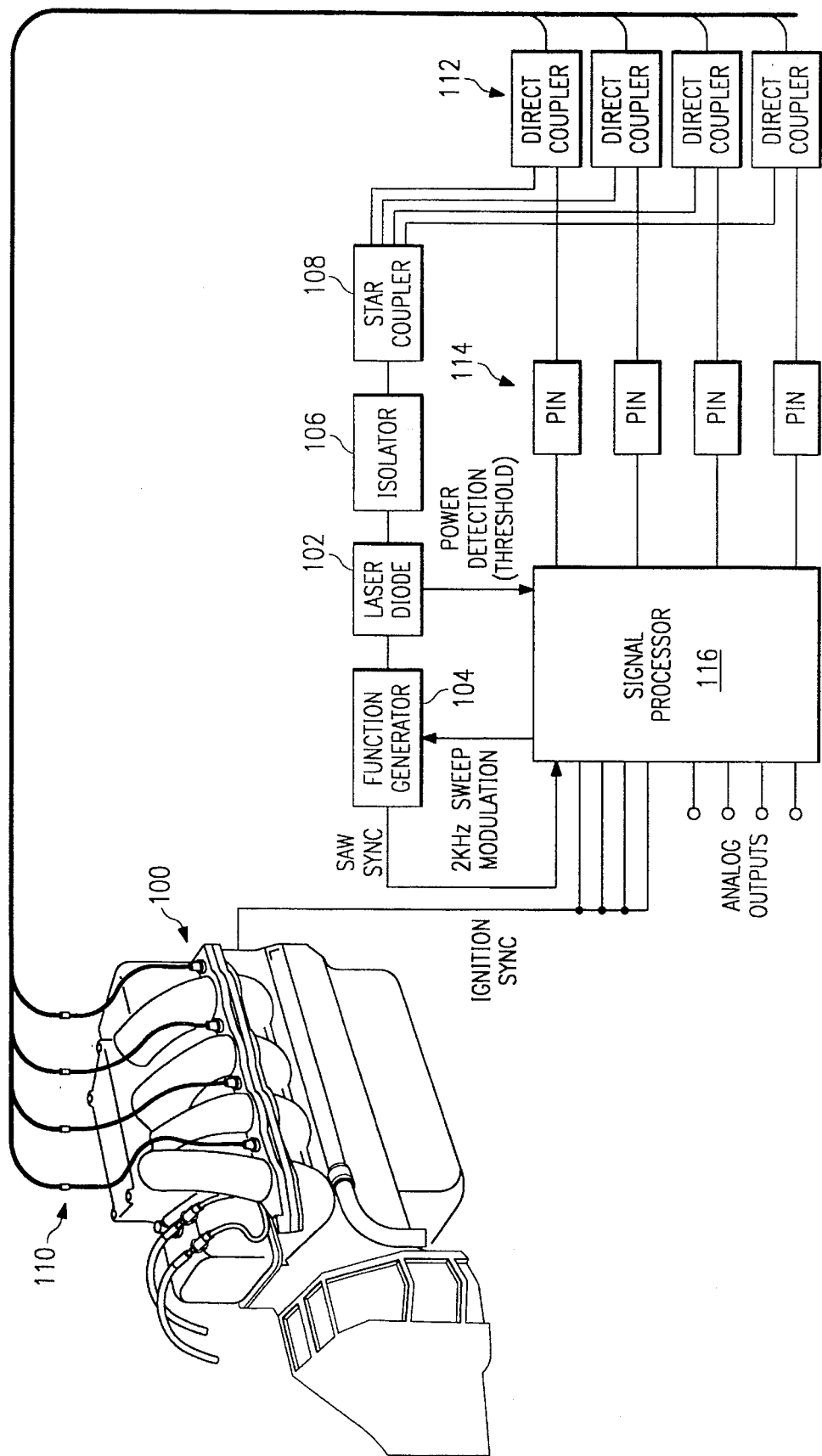
FIG. 6 is a schematic diagram of the sensing system constructed in accordance with the present invention used to measure in-cylinder pressure in an engine.

Such a system using the arrangement of FIG. 5 has been successfully tested in a four-cylinder Onan gasoline-fueled engine 100 loaded with a 15 kW generator as shown in FIG. 6. Light from a single semiconductor laser diode 102 modulated with a sawtooth waveform generated by a function generator 104 is coupled into a single mode fiber and through an isolator 106 to prevent feedback to the laser diode 102. The laser light is split by a star coupler 108 to provide optical power to each sensor 110 placed in each cylinder of the engine 100 to measure in-cylinder pressure. A portion of the reflected light from each sensor 100 is routed through a directional coupler 110 to a PIN photodiode 114, which converts the optical signal to an electrical signal. The four electrical signals are then provided to a signal processor 116 which computes the temporal dependence of in-cylinder pressure according to the process described above.

Figure 7:
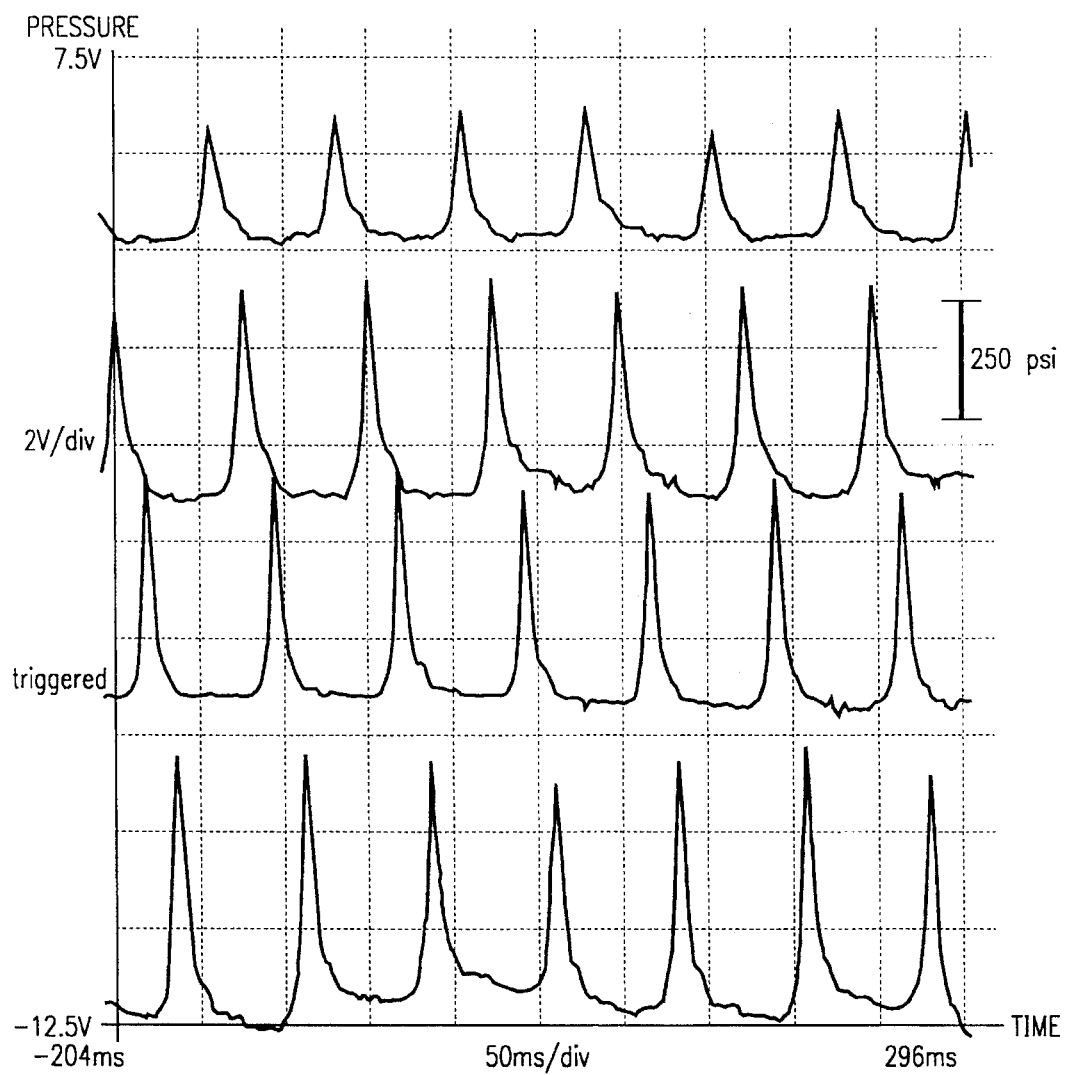
FIG. 7 shows a pressure vs. time plot for a four cylinder engine measured using the present invention in the configuration of FIG. 6.

An example of the output data showing oscilloscope tracings giving measured pressure (vertical axis) as a function of time (horizontal axis) for all four cylinders with the engine operating at 1800 rpm is shown in FIG. 7.

What is claimed is:

1. Apparatus for determining the value of a measurand measured by a fiber optic interferometer sensor, comprising
   a light source emitting a light having a predetermined frequency;
   a first photodetector coupled to said light source producing a first electrical signal proportional to said light;
   fiber optic means coupled between said light source and said fiber optic interferometer sensor transmitting at least a portion of said light to said interferometer; a second photodetector coupled to said fiber optic interferometer sensor detecting at least a portion of said light transmitted through or reflected from said interferometer, and producing a second electrical signal proportional thereto;
   an adjustable amplifier coupled to said second photodetector for amplifying said second electrical signal therefrom;
   a comparator coupled to said second photodetector for comparing said second electrical signal with said first electrical signal, producing a first output voltage in response to said first electrical signal exceeding said second electrical signal, and producing a second output voltage in response to said first electrical signal not exceeding said second electrical signal;
   a microcontroller coupled to said comparator generating a plurality of trigger signals at a fixed frequency, each initiating a modulation cycle and further generating a control signal in response to detecting a predetermined transition between said first and second output voltages;
   a modulator coupled to said light source and said microcontroller for modulating the frequency of said light source in a periodic manner in response to receiving a trigger signal from said microcontroller;
   a counter coupled to said microcontroller and beginning counting in response to receiving a trigger signal, ending counting in response to receiving said control signal from said microcontroller, and generating a count value; and
   said microcontroller computing a measurand value in response to receiving said count value for each modulation cycle.

2. The apparatus of claim 1, wherein said microcontroller subtracts a predetermined bias value from said count value, and multiplies thereafter by a predetermined calibration factor to produce a digital output representation of said measurand.

3. The apparatus of claim 1, further comprising a digital-to-analog converter coupled to said microcontroller producing an analog representation of said measurand.

4. The apparatus of claim 1, wherein said light source is a semiconductor laser diode generating light of substantially a single frequency.

5. The apparatus of claim 1, wherein said modulator generates a time-varying periodic modulating waveform in response to receiving a trigger signal from said microcontroller.

6. The apparatus of claim 1, wherein said fiber optic interferometer sensor is a fiber Fabry-Perot interferometer.

7. The apparatus of claim 1, wherein said fiber optic interferometer sensor is a Mach-Zehnder interferometer.

8. The apparatus of claim 1, wherein said fiber optic interferometer sensor is a Michelson interferometer.

9. The apparatus of claim 1, further comprising an optical isolator coupled to said light source.

10. The apparatus of claim 1, wherein said fiber optic means includes a length of optic fiber and an optical coupler.

11. The apparatus of claim 1, wherein said modulator generates a sawtooth periodic modulating waveform.

12. The apparatus of claim 1, wherein said microcontroller and said counter are integrated on a single semiconductor substrate.

13. A fiber optic interferometric sensing system, comprising:
   a laser light source emitting a light having a predetermined frequency;
   a first photodetector coupled to said light source producing a first electrical signal proportional to said light;
   a fiber optic interferometer sensor positioned to sense a predetermined measurand;
   fiber optic means coupled between said light source and said fiber optic interferometer sensor transmitting at least a portion of said light to said interferometer sensor;
   a second photodetector coupled to said fiber optic interferometer sensor detecting at least a portion of said light transmitted through or reflected from said interferometer sensor, and producing a second electrical signal proportional thereto;
   an adjustable amplifier coupled to said second photodetector for amplifying said second electrical signal therefrom;
   a comparator coupled to said second photodetector for comparing said second electrical signal with said first electrical signal, producing a first output signal in response to said first electrical signal exceeding said second electrical signal, and producing a second output signal in response to said second electrical signal exceeding said first electrical signal;
   a microcontroller coupled to said comparator generating a plurality of trigger signals at a fixed frequency, each initiating a modulation cycle and further generating a control signal in response to detecting a predetermined transition between said first output signal and said second output signal;
   a modulator coupled to said light source and said microcontroller for modulating the frequency of said laser light source in a periodic manner in response to receiving a trigger signal from said microcontroller;
   a counter coupled to said microcontroller and beginning counting in response to receiving a trigger signal, ending counting in response to receiving said control signal from said microcontroller, and generating a count value; and said microcontroller computing a measurand value in response to receiving said count value for each modulation cycle.

14. A fiber optic interferometric sensing system, comprising:

a laser light source emitting a light having a predetermined frequency;
a first photodetector coupled to said light source producing a first electrical signal proportional to said light;

a plurality of fiber optic interferometer sensors positioned to sense a plurality of parameters;

fiber optic means coupled between said light source and said plurality of fiber optic interferometer sensors transmitting at least a portion of said light to each of said interferometer sensors;

a plurality of second photodetectors coupled to respective fiber optic interferometer sensors detecting at least a portion of said light transmitted through or reflected from said respective interferometer sensors, and each producing a second electrical signal proportional thereto;

a plurality of adjustable amplifiers coupled to said respective second photodetectors and amplifying said respective second electrical signals therefrom;

a plurality of comparators coupled to respective second photodetectors for comparing respective second electrical signals with said first electrical signal, each producing a respective first output signal in response to said first electrical signal exceeding said respective second electrical signal, and each producing a second respective output signal in response to said respective second electrical signal exceeding said first electrical signal;

a system clock generating a plurality of trigger signals at a fixed frequency, each initiating a modulation cycle;

a modulator coupled to said light source and said system clock for modulating the frequency of said laser light source in a periodic manner in response to receiving said trigger signals;

a plurality of microcontrollers coupled to said respective comparators and generating a respective control signal in response to detecting a predetermined transition between said respective first and second output signals after the initiation of a modulation cycle;

a plurality of counters coupled to said respective microcontrollers and beginning counting in response to receiving a trigger signal from said system clock, ending counting in response to receiving said respective control signal from said respective microcontroller, and generating a respective count value; and said plurality of microcontrollers each computing a respective parameter value in response to receiving said respective count value for each modulation cycle.

15. The system of claim 14, wherein each said microcontroller subtracts a predetermined bias value from said respective count value, and multiplies thereafter by a predetermined calibration factor to produce a respective digital output representation of said respective parameter.

16. The system of claim 14, further comprising a plurality of digital-to-analog converters coupled to said respective microcontrollers for producing an analog representation of said respective parameters.

17. The system of claim 14, wherein said laser light source is a semiconductor laser diode generating light of substantially a single frequency.

18. The system of claim 14, wherein said modulator generates a time-varying periodic modulating waveform in response to receiving a trigger signal from said system clock.

19. The system of claim 14, wherein at least one of said plurality of fiber optic interferometer sensors is a fiber Fabry-Perot interferometer.

20. The system of claim 14, wherein at least one of said plurality of fiber optic interferometer sensors is a Mach-Zehnder interferometer.

21. The system of claim 14, wherein at least one of said plurality of fiber optic interferometer sensors is a Michelson interferometer.

22. The system of claim 14, further comprising an optical isolator coupled to said laser light source.

23. The system of claim 14, wherein said fiber optic means includes a optical coupler.

24. The system of claim 14, wherein said microcontrollers and counters are integrated on a single semiconductor substrate.

25. A method for sensing a predetermined measurand using a fiber optic interferometer sensor, comprising the steps of:

producing a light having substantially a single frequency;
generating a first electrical signal proportional to an optical power of said light;
periodically generating a trigger signal for initiating a modulation cycle;
starting a count and accumulating a count value in response to said trigger signal;
modulating said frequency of said light in a periodic manner in response to said trigger signal;
injecting at least a portion of said frequency-modulated light into said fiber optic interferometer sensor;
sensing light returning from said fiber optic interferometer sensor and generating a second electrical signal proportional to an optical power of said returning light;
adjustably amplifying said second electrical signal prior to said comparing step;
comparing said second electrical signal with said first electrical signal, producing a first output signal in response to said first electrical signal exceeding said second electrical signal, and producing a second output signal in response to said first electrical signal not exceeding said second electrical signal;
generating a control signal in response to detecting a predetermined transition between said first and second output signals;
ending said count in response to said control signal; and
computing a measurand value from said count value for each modulation cycle.

26. The method of claim 25, further comprising the step of reflecting said light injected into said fiber optic interferometer sensor.

27. The method of claim 25, further comprising the step of allowing said injected light to pass through said fiber optic interferometer sensor.

28. The method of claim 25, wherein said modulating step includes the step of modulating said light frequency with a time-varying periodic waveform.

* * * * *